UNITED STATES PATENT OFFICE.

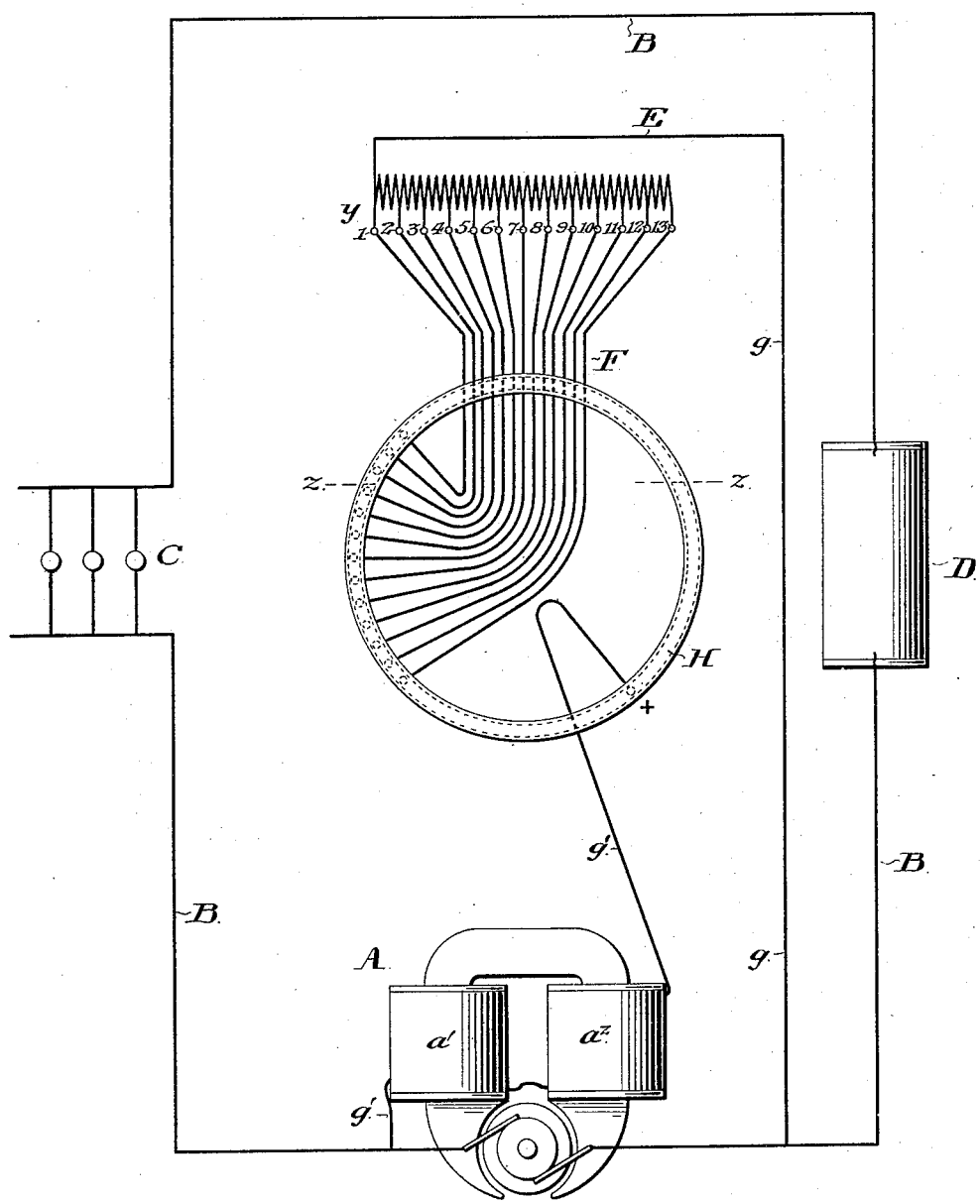

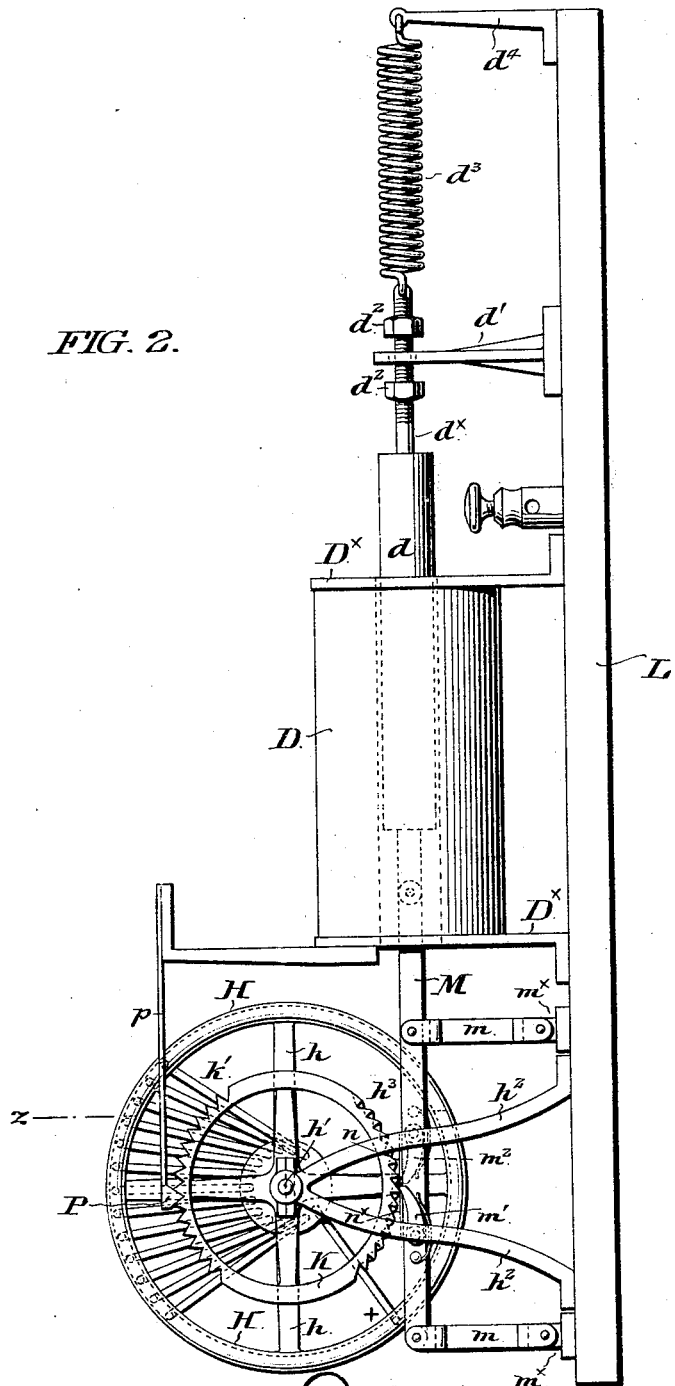

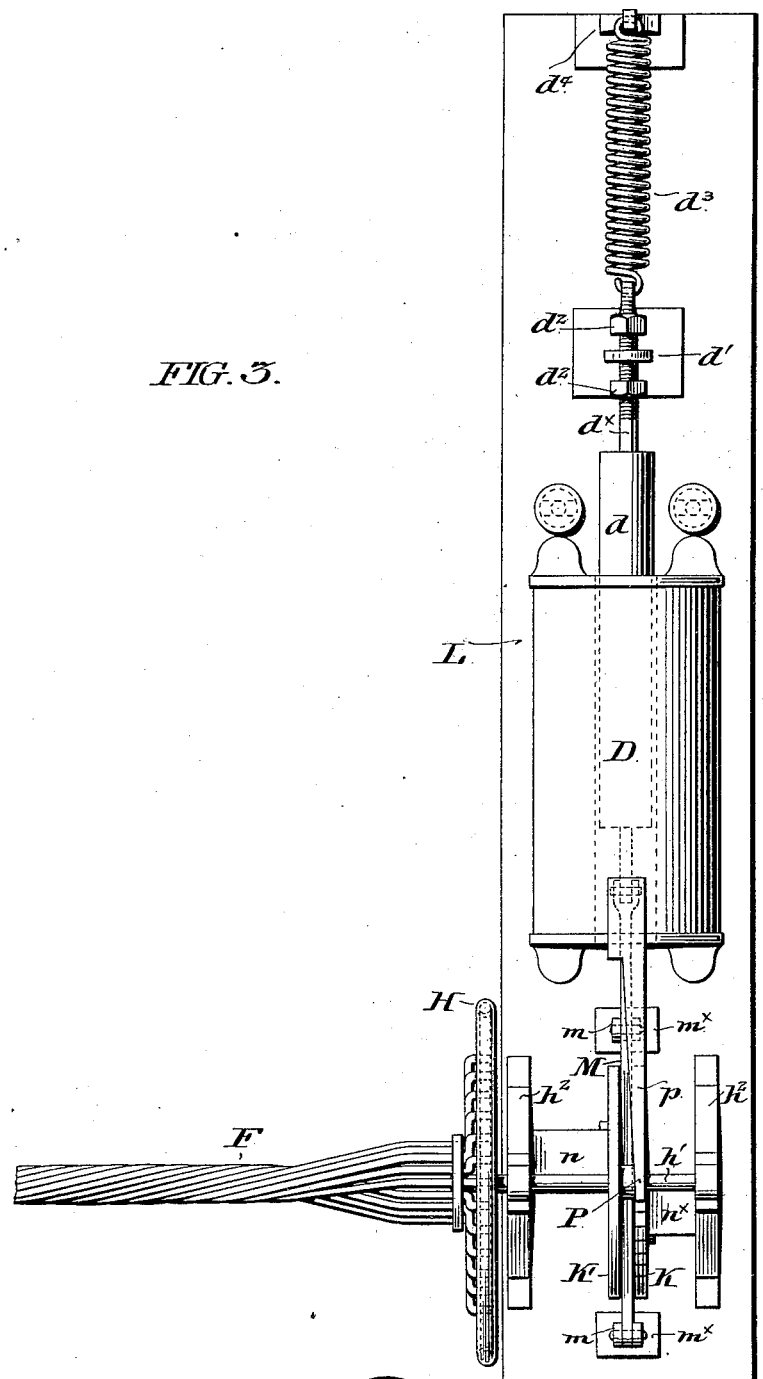

PATRICK KENNEDY, OF BROOKLYN, NEW YORK.

MEANS FOR CONTROLLING ELECTRIC CURRENTS.

SPECIFICATION forming part of Letters Patent No. 558,650, dated April 21, 1896.

Application filed June 27, 1895. Serial No. 554,283. (No model.)

*To all whom it may concern:*

Be it known that I, PATRICK KENNEDY, a citizen of the United States, residing in the city of Brooklyn, Kings county, in the State of New York, have invented certain new and useful Improvements in Means for Controlling Electric Currents, of which the following is a specification.

My invention relates to electric currents which connect a dynamo or other source of electric energy with an apparatus or series of devices to be operated by such energy, and especially to circuits in which are included a series of lamps.

In the practical operation of circuits of this character it is desirable that the strength of the current should bear a fixed given relation to the requirements of the apparatus or devices operated, and that it should be accurately automatically controlled or governed, so as to be lessened when it has been unduly increased by supply beyond the needs of the operated devices in the circuit—as, for instance, when a number of the devices are cut out of operation, or when the dynamo or generator produces excess of current—and so as to be increased when an increased number of the devices to be operated are placed in the circuit, to the end that the devices to be operated shall receive with precision the predetermined quantity of current necessary. This is especially desirable in the case of lamp-circuits, owing to the fragile character of the lamps and their liability to destruction by excess of current and the necessity for causing them to burn with uniform and unvarying radiance.

It is the object of my invention to provide means to control or regulate the current of an electric circuit to maintain it at a given predetermined strength proportioned to the requirements of the operated devices within the circuit.

My invention is especially designed and intended for use in connection with dynamos employed to operate the lamps upon moving vehicles, such as railroad-trains, and driven, through suitable connective gearing, by a moving part of the vehicle, such as the wheel, axle, and the irregularity in the speed of which moving part renders especially desirable the provision of means to regulate the electric current produced by the irregularly-driven dynamos.

In the accompanying drawings I show and herein I describe a good form of a convenient embodiment of my invention, the particular subject-matter claimed as novel being hereinafter definitely specified.

In the accompanying drawings, Figure 1 is a view, partially diagrammatic, of conductors and other devices embodying a good form of my invention, the parts being shown and indicated in such manner as to render their relation and operation more easy of explanation rather than to illustrate the precise form and arrangement resorted to in their practical construction for use. Fig. 2 is a view in side elevation, and Fig. 3 a view in front elevation, of the annulus and solenoid and their associated devices employed in the preferred embodiment of my invention.

Similar letters and numerals of reference indicate corresponding parts.

Referring first to the diagram of Fig. 1, A is the generator, (shown as a dynamo,) preferably of the shunt-wound variety. B are the line-wires in circuit therewith, C are lamps, and D a solenoid included in said circuit.

H is a hollow annulus of non-conducting material, filled to the line $z\ z$ with mercury or other conducting fluid.

E are a series of resistance-coils, one end of which series is in electrical connection at the point $y$ with a shunt-conductor $g$, being one branch of the field-circuit which leads to and connects with the main line-wire B conveniently at a point between the dynamo and the solenoid.

F are a series of conductors, the lower extremities of which, hereinafter for convenience termed the "lower terminals," lead at regular intervals apart into the annulus H, and the upper extremities of which are connected with a corresponding series of terminals 1 2 3 4 5, &c., hereinafter termed the "upper terminals," of which terminals that designated 1 is in electrical connection with the conductor $g$, while the remainder are in electrical connection with the series of resistance-coils at regular intervals along the length of the latter.

The field-magnets $a'\ a^2$ of the dynamo are connected by a shunt-conductor $g'$, which constitutes the other branch of the field-circuit, and which leads from the main line-wire B to and about said magnets, and thence to the annulus, within the interior of the lower portion of which it terminates.

The annulus H is so mounted or supported as to be capable of rotatory oscillation. The solenoid D is as to its hollow interior provided with a core longitudinally movable therein and connected to the annulus by suitable gearing, with the result that movement of the core occasions corresponding oscillation of the annulus, all as hereinafter more fully described.

As will be understood from an examination of the diagram as thus explained, the line-wires B form the main or working circuit in which the lamps or other instrumentalities to be operated are placed, while the branch conductor $g'$, annulus H, with its contained mercury, the conductors F, the resistance-coils, and the branch conductor $g$ form the field-circuit, or "circuit of control," as it may be more broadly termed.

The dynamo A of course supplies through the main line-wires B the necessary energy to the lamps or other electro-receptive devices to be operated, and the current set up in the circuit of said line-wires, passing through the solenoid, controls the set of its movable core.

The strength of current passed through the main-line conductors will depend upon the amount of current generated by the dynamo and will be proportional to the amount of current in the said field-circuit.

As will be understood, the conductors F, the lower terminals of which are beneath the surface of the mercury within the annulus, will be in circuit with the conductor $g'$, leading from the dynamo, while those the lower terminals of which are above said surface will be insulated and for the time being out of operation.

The upper terminals of the conductors F are, as described, in electrical communication with resistance-coils at intervals along the length of the latter, that conductor the lower terminal of which is highest in the series of lower terminals within the annulus being, as to its upper terminal, the nearest of the series of the upper terminals to the point $y$, and so on through the series, the conductor F which is as to its lower terminal lowest of the series of lower terminals within the annulus being, as to its upper terminal, connected to the resistance-coils at a point the farthest of any of the upper terminals from the point $y$. As a result of this arrangement the current passing through the field-circuit will pass through those conductors F the lower terminals of which are for the time being beneath the liquid-level in the annulus, but the greatest proportion of the current will pass through such of said conductors as are, as to their upper terminals, connected to the resistance-coils at points nearest the point $y$. The resistance is thus varied by any change in the number of short-circuiting conductors F beneath the liquid-level in said annulus. When, now, a number of the lamps are switched out of circuit or when the current from the dynamo becomes excessive, the additional strength of the current will cause a corresponding movement of the core of the solenoid, which, being connected, as stated, to the annulus, oscillates said annulus slightly to the right, so that one or more of the conductors will be carried above the liquid-level and thereby insulated, with the result that the current of said field-circuit is compelled to pass through the remaining conductors F, which are in communication with the resistance-coils at a considerable distance from the point $y$, and hence said current of the field-circuit meets a correspondingly-increased resistance and correspondingly diminishes the operation of the dynamo. The degree of movement of the annulus will, of course, be governed by the degree of movement of the core of the solenoid, and one, two, or any number of said conductors may in said movement be carried above the liquid-level of the mercury according to the strength of the current in the main line-wires. When, on the other hand, by the switching in of an increased number of lamps, or otherwise, the strength of the current in the conductors B falls below the necessities of the lamps, a corresponding movement of the core $d$ is occasioned, and thereupon the annulus is oscillated or moved upon its axis to the left with a result correspondingly opposite to that just described.

Such being a description of the principle of operation of my improved arrangement, it will be understood that a quick and precise adjustment of the strength of the current is automatically effected each time the current in the main line-wires becomes, by increasing or decreasing, out of proportion to the needs of the lamps to be fed, the arrangement described being simple, not liable to get out of order, and inexpensive.

I now proceed to describe with greater particularity the construction and arrangement of the annulus and solenoid and their associated parts.

The annulus H is, as shown in Fig. 2, mounted upon arms $h$, extending radially from a hub mounted upon and keyed with respect to a shaft $h'$, supported for rotative oscillation upon standards $h^2$, projecting from a supporting-bracket L.

K K' are a pair of wheels mounted and keyed upon said shaft $h'$, and provided as to a portion of their rims each with a series of inclined rack-teeth $h^3$, the teeth of the respective wheels facing in opposite directions.

Within the hollow interior of the solenoid is mounted, free for longitudinal reciprocation therein, a core $d$, provided as to one extremity with an extension $d^\times$, which is screw-threaded and extends through an opening formed in a permanent standard $d'$, mounted on the bracket L. Nuts $d^2$, mounted upon the extension $d^\times$ and existing upon opposite sides of the standard $d'$, operate, by contact with said standard, to limit the movement of the core.

$d^3$ is a spiral pull-spring, one extremity of which is connected to the free end of the extension $d^\times$, and the other to a permanent standard $d^4$, which spring operates or tends to draw the core away from the solenoid and against the pull or attraction of the latter.

The other extremity of the core $d$ is provided with a pawl-carrying bar M, hingedly connected to it and extending past the tooth-provided rims of the wheels K K'.

A pair of links $m\,m$, hingedly connected to the bar M and to studs $m^\times m^\times$, mounted upon the supporting-bracket L, maintain said bar in operative relationship with respect to said wheels.

$m'\,m^2$ are a pair of pawls carried by the bar M, mounted, respectively, upon opposite sides of said bar, and in position to engage, respectively, with the teeth of the respective wheels K K'. These pawls, which face in opposite directions, so as each to be in position to meet the inclined teeth of the wheel with which it is associated, are governed by springs which tend to force them into engagement with the teeth.

$n\,n^\times$ are a pair of plates permanently mounted upon the supports $h^2$, and interposed, respectively, between the body of the pawl $m^2$ and the rim of the wheel K' and the body of the pawl $m'$ and the rim of the wheel K, the free extremity of the pawl $m'$, when the parts are in their normal position, extending only slightly past the upper edge of the plate $n^\times$, and the free extremity of the pawl $m^2$ extending only slightly past the lower edge of the plate $n$.

The wheel K is, as to a portion of its rim, not occupied by the inclined teeth described, provided with a series of sharp A-shaped teeth $k'$, between which a V-shaped guard P, mounted upon the free extremity of a spring-arm $p$, conveniently supported upon one of the standards $D^\times$ of the solenoid D, is adapted to engage.

The set or arrangement of the parts illustrated in Figs. 2 and 3 may for convenience of description be referred to as the "normal" adjustment when the current of the proper strength in relation to the work to be done is passing through the circuit.

When for any reason the current becomes excessive, the increased attraction exerted by the solenoid draws the core downward against the stress of the spring $d^3$, and thereupon the pawl $m^2$ is carried against the crest of one of the teeth of the wheel K' and said wheel rotated to the right, Fig. 2, with the result, as already fully described in connection with the diagram of Fig. 1, of throwing into the field-circuit or circuit of control an increased resistance and thereby diminishing the action of the dynamo and consequently the strength of current in the conductors B. When, on the other hand, the current in the conductors B becomes insufficient, the attraction exerted upon the core $d$ weakens, and the spring $d^3$ draws it away from the solenoid, carrying the pawl $m'$ into engagement with one of the inclined teeth of the wheel K and rotating said wheel slightly to the left, with the result, as already explained, of lessening the resistance in the circuit of control.

The guard P, as the annulus begins to move to the right or left, ascends the side of the adjacent tooth of the series of teeth $k'$, the spring-arm $p$ yielding, and after reaching its crest is, under the stress of said spring-arm, forced down the opposite side of said tooth, thus assisting the action of the pawl to effect the movement of the annulus and hastening the immersion in or emergence from the mercury of the conductor, so as to prevent sparking.

The plates $n\,n^\times$, as will be understood, operate, when the parts are in the normal position as shown in the drawings, to hold both pawls $m'\,m^2$ out of positive engagement with the respective wheels K K', so that when the bar M is moved in one direction or the other the action of the pawl thereby brought into operation upon its wheel is not impeded by any engagement of the other pawl with the other wheel. Thus when, for example, the bar M descends and the pawl $m^2$ operates to rotate the wheels to the right one tooth or notch, and said wheels are by the guard P lightly locked, so to speak, in the new position, the bar M is thereupon free to rise again to its normal position, because the plate $n^\times$ maintains the pawl $m'$ out of engagement with the teeth of the wheel K. After each movement of the wheels, therefore, the bar M—the current being supposed brought to its required strength by the movement of the annulus—is returned to its ordinary position, and ready upon any further derangement of the current to move again in either the same or the opposite direction.

The proportioning of the parts, the number of conductors F, the relative arrangement of the electro-receptive devices, the form of the generator and of the solenoid or electro-magnectic coil are all matters within the province of the constructor, and may be varied at will, as convenience of manufacture, economy of space, or other considerations may dictate, without departure from the spirit of my invention.

Having thus described my invention, I claim—

1. In combination with a main circuit, an electrical generator adapted to supply current thereto, a circuit of control adapted to govern said generator, and comprising a branch in circuit, through resistances of unequal strength, with a series of conductors, one extremity of each of which conductors is situated within a movable vessel containing conducting fluid, said extremities being situated at different levels, with which fluid the other branch of the circuit of control is in circuit, an electromagnetic device included in the main circuit and operated by its current, and suitable mechanical connections between said electromagnetic device and said vessel by which movement of the former is transmitted to the latter, substantially as set forth.

2. In combination with a main circuit, an electrical generator adapted to supply current thereto, a circuit of control adapted to govern said generator and comprising a branch in circuit, through resistances of unequal strength, with a series of conductors, one extremity of each of which conductors is situated within a movable vessel containing conducting fluid, said extremities being situated at different levels, with which fluid the other branch of the circuit of control is in circuit, an electromagnetic device included in the main circuit and operated by its current, and suitable mechanical connections between said electromagnetic device and said vessel by which movement of the former operates to effect a change of relation between the extremities of the series of conductors and the fluid, substantially as set forth.

3. In combination with a main circuit, an electrical generator adapted to supply current thereto, a circuit of control adapted to govern said generator, a series of resistance-coils connected with a branch conductor of said circuit of control, a series of conductors connected with said coils and terminating at intervals apart in a rotatable non-conducting vessel containing conducting fluid, and a branch conductor of the circuit of control leading from said vessel, an electromagnetic device included in the main circuit and operated by its current, and suitable mechanical connections between said electromagnetic device and said vessel, by which movement of the former is communicated to the latter, substantially as set forth.

4. In combination with a main circuit, a dynamo adapted to supply current thereto, a solenoid provided with a movable core and included in said main circuit, a field-circuit in which are included a rotatable non-conducting vessel partly filled with conducting fluid with which fluid the terminal of one branch of the field-circuit wire is connected, one or a series of resistance-coils connected to the other branch of the field-circuit, a series of conductors leading from different points of the interior of the rotatable vessel to different points in the length of the resistance coil or coils, and mechanism connective of the core of the solenoid and said vessel, substantially as set forth.

5. In combination with a main circuit, a dynamo adapted to supply current thereto, a solenoid provided with a movable core and included in said main circuit, a field-circuit in which are included a rotatable non-conducting annulus partly filled with conducting fluid with which fluid the terminal of one branch of the field-circuit wire is connected, one or a series of resistance-coils connected to the other branch of the field-circuit, a series of conductors leading from different points of the interior of the rotatable annulus to different points in the length of the resistance coil or coils, an axle upon which said annulus is mounted for rotation, a toothed wheel mounted upon said axle, and a bar extending from the solenoid-core and provided with means for engaging with said toothed wheel, substantially as set forth.

6. In combination with a main circuit, a dynamo adapted to supply current thereto, a solenoid provided with a movable core and included in said main circuit, a field-circuit in which are included a rotatable non-conducting annulus partly filled with conducting fluid with which fluid the terminal of one branch of the field-circuit wire is connected, one or a series of resistance-coils connected to the other branch of the field-circuit, a series of conductors leading from different points of the interior of the rotatable annulus to different points in the length of the resistance coil or coils, an axle upon which said annulus is mounted for rotation, a toothed wheel mounted upon said axle, and a bar extending from the solenoid-core and provided with means for engaging with said toothed wheel, and a spring connected with said core which tends to carry it away from said solenoid, substantially as set forth.

7. In combination with a main circuit, a dynamo adapted to supply current thereto, a solenoid provided with a movable core and included in said main circuit, a field-circuit in which are included a rotatable non-conducting annulus partly filled with conducting fluid with which fluid the terminal of one branch of the field-circuit wire is connected, one or a series of resistance-coils connected to the other branch of the field-circuit, a series of conductors leading from different points of the interor of the rotatable annulus to different points in the length of the resistance coil or coils, an axle upon which said annulus is mounted for rotation, a toothed wheel mounted upon said axle, and a bar extending from the solenoid-core and provided with means for engaging with said toothed wheel, a spring connected with said core which tends to carry it away from said solenoid, and means for limiting the end movement of said core, substantially as set forth.

8. In combination with a main circuit, a dynamo adapted to supply current thereto, a solenoid provided with a movable core and included in said main circuit, a field-circuit in which are included a rotatable non-conducting annulus partly filled with conducting fluid with which fluid the terminal of one branch of the field-circuit wire is connected, one or a series of resistance-coils connected to the other branch of the field-circuit, a series of conductors leading from different points of the interior of the rotatable annulus to different points in the length of the resistance coil or coils, an axle upon which said annulus is mounted and keyed, a pair of wheels mounted and keyed upon said axle and having each a series of inclined teeth the teeth of the respective wheels being inclined in opposite directions, a bar extending from the core and provided with oppositely-facing pawls adapted to engage respectively with the teeth of the respective toothed wheels, substantially as set forth.

9. In combination with a main circuit, a dynamo adapted to supply current thereto, a solenoid provided with a movable core and included in said main circuit, a field-circuit in which are included a rotatable non-conducting annulus partly filled with conducting fluid with which fluid the terminal of one branch of the field-circuit wire is connected, one or a series of resistance-coils connected to the other branch of the field-circuit, a series of conductors leading from different points of the interior of the rotatable annulus to different points in the length of the resistance coil or coils, an axle upon which said annulus is mounted and keyed, a pair of wheels mounted and keyed upon said axle and having each a series of inclined teeth, the teeth of the respective wheels being inclined in opposite directions, a bar extending from the core and provided with oppositely-facing pawls adapted to engage respectively with the teeth of the respective toothed wheels, one of said wheels being provided with a series of pointed teeth, a guard mounted upon a spring-arm and adapted to engage between said teeth, substantially as set forth.

10. In combination, with a main circuit, a dynamo adapted to supply current thereto, a solenoid provided with a movable core and included in said main circuit, a field-circuit in which are included a rotatable non-conducting fluid with which fluid the terminal of one branch of the field-circuit wire is connected, one or a series of resistance-coils connected to the other branches of the field-circuit, a series of conductors leading from different points of the interior of the rotatable annulus to different points in the length of the resistance coil or coils, an axle upon which said annulus is mounted and keyed, a pair of wheels mounted and keyed upon said axle and having each a series of inclined teeth the teeth of the respective wheels being inclined in opposite directions, a bar extending from the core and provided with oppositely-facing pawls adapted to engage respectively with the teeth of the respective wheels, one of said wheels being provided with a series of pointed teeth, a guard mounted upon a spring-arm and adapted to engage between said teeth, and plates interposed between the bodies of the pawls and the faces of the wheels with which they are associated, substantially as set forth.

11. In combination with a main circuit, a dynamo adapted to supply current thereto, a solenoid provided with a movable core and included in said main circuit, a field-circuit in which are included a rotatable non-conducting annulus partly filled with conducting fluid, with which fluid the terminal of one branch of the field-circuit wire is connected, one or a series of resistance-coils connected to the other branch of the field-circuit, a series of conductors leading from different points of the interior of the rotatable vessel to different points in the length of the resistance coil or coils, an axle upon which said annulus is mounted and keyed, a pair of wheels mounted and keyed upon said axle and having each a series of inclined teeth, the teeth of the respective wheels being inclined in opposite directions, a bar extending from the core and provided with oppositely-facing pawls adapted to engage respectively with the teeth of the respective wheels, one of said wheels being provided with a series of pointed teeth, a guard mounted upon a spring-arm and adapted to engage between said teeth, plates interposed between the bodies of the pawls and the faces of the wheels with which they are associated, a spring which tends to carry the core away from the solenoid, and means for limiting the movement of said core, substantially as set forth.

In testimony that I claim the foregoing as my invention I have hereunto signed my name this 13th day of June, A. D. 1895.

PATRICK KENNEDY.

In presence of—
F. NORMAN DIXON,
THOMAS K. LANCASTER.